United States Patent Office 3,419,461
Patented Dec. 31, 1968

3,419,461
POLYMERIC LAMINATE AND ARTICLE
COVERED THEREWITH
John C. Gebhard, Jr., West Chester, Pa., and Edward J.
Mead, Wilmington, Del., assignors to E. I. du Pont de
Nemours and Company, Wilmington, Del., a corporation of Delaware
No Drawing. Filed May 2, 1966, Ser. No. 546,522
15 Claims. (Cl. 161—184)

ABSTRACT OF THE DISCLOSURE

A thermoformable material that is also durable and weatherable and, hence, useful as a protective coating for exposed exterior building parts is composed of a laminate of a thin polyvinyl fluoride film bonded to a relatively thick base sheet of a filled copolymer. The copolymer is composed of a hydrocarbon monomer having the formula R—CH=CH$_2$, R being hydrogen or a lower alkyl radical and an alpha,beta-ethylenically unsaturated carboxylic acid having 3–8 carbon atoms. The filler is 10–60 weight percent of an amphoteric oxide.

---

This invention relates to novel laminates primarily for use as protective coatings or cladding materials and to a process for using the laminates to obtain intimate coatings on such building materials as wood, fiberboard, metal, plaster, cement, etc.

Exposed exterior building materials should be resistant to heat and cold, resistant to moisture, resistant to atmospheric oxidation, resistant to fungus attack, etc. In short, such materials should be durable and weatherable. The many attractive properties of polyvinyl fluoride have made this polymer desirable as a protective coating for roofing, siding, trim, etc. As a self-supporting film, polyvinyl fluoride film displays toughness, abrasion-resistance, resistance to soiling, oxidation and to the action of many solvents. Furthermore, polyvinyl fluoride film displays an amazing retention of its attractive properties at both high and low temperatures. Specifically, polyvinyl fluoride in the form of unsupported films having a thickness of at least 20 mils possesses the durability and weatherability necessary for exterior use. However, such relatively thick films are expensive; and, more important, they cannot be formed easily over the underlying material by molding or thermoforming techniques. In reduced thicknesses, polyvinyl fluoride films tend to develop tears, holes and other imperfections during the molding and forming operations.

It is, therefore, an object of this invention to provide a polymeric material having a thin polyvinyl fluoride face and an inexpensive backing, wherein the combination is thermoformable over the generally used structural materials. More specific objects are to provide a process and a material for successfully cladding wood, plaster, fiberboard, and the like. Other objects will appear hereinafter. The objects are accomplished by a novel polymeric laminate composed of (1) a base sheet of a copolymer of a hydrocarbon monomer having the formula

R—CH=CH$_2$

R being hydrogen or an alkyl radical having 1 to 8 carbon atoms, preferably ethylene, and a minor amount of an alpha,beta-ethylenically unsaturated carboxylic acid having 3 to 8 carbon atoms, preferably methacrylic acid, filled with 10–60 weight percent of an amphoteric oxide, preferably portland cement, and (2) a top sheet of a thin polyvinyl fluoride film. Specifically, the objects are accomplished by using (1) a base sheet, the sheet being preferably at least 5 mils thick, of a copolymer of 80–95 weight percent ethylene and, correspondingly, 20–5 weight percent of an alpha,beta-ethylenically unsaturated carboxylic acid, preferably methacrylic acid, filled with 20–35 weight percent, based on the weight of the copolymer, of portland cement, and (2) a top sheet of polyvinyl fluoride that is preferably from 0.025 to 0.5 times the thickness of the base sheet but no greater than 10 mils. The usual thicknesses of the base sheet in this invention are from 20 to 30 mils and rarely, if ever, greater than 250 mils; while the thicknesses of the top sheet generally useful in this invention are from 0.5 to 5 mils.

It has been found that this laminate can be thermoformed easily at moderate temperatures using conventional equipment to clad among other things wooden and cementitious articles and specifically, such items as frames and doors of wood, pressed wood, wallboard, gypsum board; ornamental objects of plaster, foamed plastics, etc. It is believed that the relative specific heats of the back sheet (0.4 to 0.6 calorie per degree centigrade per gram) and the top sheet (0.21 to 0.28 calorie per degree centigrade per gram) contribute to the success of the laminate in the thermoforming operation. Hence, such halogenated polymers as polytetrafluoroethylene, polychlorotrifluoroethylene, polyvinyl chloride, and copolymers such as tetrafluoroethylene-hexafluoropropylene copolymer, polyvinyl chlorinal-acetate copolymers, all having specific heats between 0.21 and 0.28 calorie per degree centigrade per gram, should also operate successfully as top sheets in the laminate of the invention.

PREPARATION OF THE POLYVINYL FLUORIDE SHEET

The polyvinyl fluoride films or sheets can be prepared by conventional procedures. These are described in U.S. Patents 2,953,818 and 3,139,470. One method involves feeding a mixture of latent solvent and polyvinyl fluoride to a heated extruder which is connected to a slotted casting hopper. A tough extrudate of polyvinyl fluoride is extruded continuously in the form of a film containing the latent solvent. The film can then be dried, or alternatively, it can be heated and stretched in one or more directions while the solvent is volatilized therefrom. Films of polyvinyl fluoride can also be cast from dilute solutions of the polymer in latent solvent as described in U.S. Patents 2,419,008 and 2,419,010. If desired various color and physical effects can be achieved by incorporating pigments and fillers in the polyvinyl fluoride film during the manufacture thereof. Thus, metallic oxides, hydroxides, chromates, silicates, sulfides, sulfates and carbonates, organic dyes and flakes thereof and carbon blacks can be incorporated into the film.

Prior to laminating the polyvinyl fluoride film to the base sheet, it is necessary to chemically activate its surface by forming in the surface layer functional groups, e.g., hydroxyl, carboxyl, carbonyl, amino, amido and ethylenically unsaturated radicals. The surface of the polyvinyl fluoride film may be activated by exposing the film to a gaseous Lewis acid such as boron trifluoride, aluminum trichloride, or titanium tetrachloride or a liquid composition containing a coordination complex thereof; or exposing the film to concentrated sulfuric acid, fuming sulfuric acid, sulfur trioxide or hot sodium hydroxide; or exposing one surface of the film to an open flame while cooling the opposite surface; or subjecting the film to a high frequency, spark discharge.

One particularly desirable procedure for imparting adherability to polyvinyl fluoride film involves passing the film through a stainless steel-lined treating chamber containing a gaseous mixture containing 1 to 90% by volume of boron trifluoride at a temperature of 20 to 75° C., the dwell time in the chamber being 3 to 30 seconds; then washing the resulting film either in ammonium hydroxide and then water or in water alone. Other suitable procedures for activating the surface are disclosed in U.S. Patent No. 3,228,823 to Usala and Wolinski.

It should be understood that polyvinyl fluoride embraces, in addition to homopolymers of vinyl fluoride, copolymers of vinyl fluoride with other monoethylenically unsaturated monomers copolymerizable therewith, wherein the vinyl fluoride is present in substantial or major amounts, i.e., at least 75% to 80% of the total by weight. Examples of such other monomers are monoethylenic hydrocarbons, e.g., ethylene, propylene, isobutylene and styrene; halogen-substituted monoethylenic hydrocarbons, e.g., vinyl chloride, vinyl bromide, 1,1-dichloroethylene, 1,1-difluoroethylene, difluorochloroethylene, trifluorochloroethylene, tetrafluoroethylene, trifluoropropylene, difluoroisobutylene; vinyl esters, e.g., vinyl formate, vinyl acetate, vinyl propionate, vinyl butyrate, vinyl benzoate, vinyl pivalate, vinyl stearate, and vinyl esters of inorganic acids; vinyl ethers, e.g., vinyl ethyl ether, tetrafluoroethylallyl ether and vinyl dioxolane; vinyl ketones, e.g., methyl vinyl ketone; N-vinyl imides, e.g., N-vinyl succinimide and N-vinyl phthalimide; acrylic and methacrylic acids and their derivatives, e.g., esters, amides, anhydrides and acid halides, including methyl methacrylate, betahydroxyethyl methacrylate, allyl methacrylate, N-butyl methacrylamide, etc.; derivatives of maleic and fumaric acids, e.g., diethylmaleate and dimethylfumarate; propenyl esters, e.g., allyl acetate, isopropenyl acetate, etc.

PREPARATION OF THE BASE SHEET

In preparing the base sheet, the copolymer is first prepared by using processes known in the art. Thus, ethylene and methacrylic acid may be introduced with a free radical polyymerization catalyst into a polymerization environment maintained at a pressure of 50 to 3000 atmospheres and a temperature of 150 to 300° C. An inert solvent such as water or benzene may be used. The copolymers may also be obtained by grafting the acid to polyethylene. In any event, the resulting copolymer should have a high molecular weight as defined by a melt index [1] of 0.2 to 40 grams/10 minutes at 190° C.

Alternatives to ethylene for preparing the copolymer include propylene, butene-1, heptene-1, 3-methylbutene-1 and 4-methylbutene-1. Specific acids, besides methacrylic acid, that may be copolymerized with the hydrocarbon monomer include acrylic acid, ethacrylic acid, itaconic acid, maleic acid and fumaric acid. The monoesters of these acids, e.g., ethyl hydrogen fumarate, and the anhydrides, e.g., maleic anhydride, are considered acids for copolymerization purposes.

The copolymers need not be two component polymers. Thus, although the hydrocarbon monomer content of the copolymer should be at least 50 mol percent, more than one hydrocarbon monomer can be employed to provide the hydrocarbon nature of the copolymer. More than one alpha,beta-ethylenically unsaturated carboxylic acid may also be employed. Additionally, any third copolymerizable monomer can be employed in combination with the hydrocarbon monomer and the carboxylic acid comonomer. Preferred termonomers are vinyl esters and alkyl acrylates, e.g., vinyl acetate, vinyl propionate, alkyl acrylates and methacrylates having up to 8 carbon atoms, such as methyl methacrylate and ethyl acrylate.

The portland cement component of the thermoplastic composition used as the base sheet in the present invention may be of the five commercially available types designated as ASTM C150–46 (1946), by the American Society of Testing Materials. Each type has a different chemical composition and a different physical property when set. The chemical and physical properties of these various cements are available in the literature—see for example, The Chemistry of Portland Cement, by R. H. Bogue, Reinhold Publishing Corporation, New York (1947). The only limitation on the cement is that the amount of free lime therein be below 5% by weight of the cement.

To obtain a thermoplastic base sheet having substantially unchanging melt flow characteristics, the process for incorporating the portland cement into the copolymer described and claimed in U.S. patent application Ser. No. 442,956 to Wolfe, filed Mar. 26, 1965, is recommended. Specifically, the copolymer and portland cement should be kneaded at a temperature above the softening point of the polymer but below 275° C. while removing water from the reaction mass in a manner and at a rate to prevent hydration of the cement. Removal of water may be accomplished by using a vacuum or passing a dry moist gas over the surface of the reaction mass during kneading.

Other additives may be used without detracting from the desirable properties of the base sheet. Thus, coloring pigments such as carbon black, titanium dioxide, iron blacks, chromate yellows, chrome greens, etc., may be added with the cement. The use of fibrous inorganic materials, e.g., asbestos fibers, fibrous alumina, fibrous boehmite, etc., is also contemplated.

FORMING THE LAMINATE

The laminate may be prepared by coating one or both surfaces to be adhered with any of a wide variety of adhesive compositions; removing most of the solvent from the adhesive compositions; bringing together the surfaces to be adhered (the chemically activated surface of the polyvinyl fluoride film and a surface of the base sheet), applying a pressure of 20 to 400 p.s.i. to form the laminate; and curing the adhesive. Even stronger bonds may be obtained if the surface of the base sheet to be adhered is also activated by flame treatment or spark discharge as described for the polyvinyl fluoride sheet. It is also possible to laminate the base and top sheets without an adhesive by using a combination of high pressure (as high as 5000 p.s.i. or more) and elevated temperature.

The adhesives can be thermoplastic, elastomeric or thermosetting. The thermoplastic adhesives include the asphalt and acrylic types; thermosetting, the epoxide resin types; and elastomeric, the polyester types and the synthetic rubber types having either a nitrite/butadiene base, a neoprene base, or acrylic base. The preferred adhesives are those disclosed in U.S. Patent No. 3,228,823. These adhesives are combinations of amino ester-modified vinyl polymers with either a polyglycidyl ether of a dihydric phenolic compound or a vinyl-type epoxy compound as defined in the aforementioned Usala and Wolinski patent. Specifically, the preferred adhesive is a mixture of an amino ester-modified vinyl polymer, the amino-nitrogen content of said polymer being at least 0.1% based on the weight of the vinyl polymer and a compound selected from the group consisting of a polyglycidyl ether of a dihydric phenolic compound having an epoxy equivalent of 100–3000 and a vinyl type epoxy compound having an epoxy equivalent of $7.69 \times 10^{-5}$ to $76.9 \times 10^{-4}$ mols epoxy per gram of polymer. They are usually applied as solutions in volatile organic solvents, but may be applied, if the situation warrants, as aqueous dispersions. Amine curing agents as well as antioxidants, corrosion inhibitors, pigments, delustering agents, ultraviolet absorbers, cross linking agents may be blended with the preferred adhesives. Versamid 125, a polyamide resin manufactured by General Mills Corporation, is a desirable blending agent since it serves as both a plasticizer and curing agent.

The following examples demonstrate the usefulness and the thermoformability of the laminate of this invention. Specific examples illustrate that the laminate can be thermoformed simultaneously with the cladding operation, the vacuum providing the bonding pressure for cladding. It will also be noted that the laminate can be used in conventional thermoforming operations to clad both simple and complicated shapes.

In the examples, all percentages are by weight unless otherwise stated. The examples are presented merely as

---

[1] Described in ASTM D1238–57T.

illustrations of the invention and should not be considered limitative thereof.

Example 1

Two standard unprimed gliding door frames (6 ft. x 6 in.) less the sliding glazed sections are coated with about 2.2 mils of the preferred adhesive and are allowed to dry at about 80° F. in air for 15 minutes or at 170° F. for 2 minutes until the adhesive becomes tacky. The adhesive used is composed of 32 parts of an amino ester-modified vinyl polymer (44.5 parts n-butyl methacrylate, 44.5 methyl methacrylate, and 11 methacrylic acid) having 1.53% combined amino nitrogen, and 32 parts of a liquid aromatic epoxy resin having an epoxy equivalent of 225–250 in 84 parts of toluene to which 3.2 parts of dimethylaminophenol and 3.2 parts of Versamid 125 has been added. The frames are then placed onto the platform jig of a commercially available, single-stage, 6 ft. x 8 ft. vacuum forming machine.

An uncoated, single 8 ft. x 43 in. sheet of laminated white polyvinyl fluoride (1.5 mils thick) and a sheet (25 mils thick) of a 25 percent white cement–2 percent $TiO_2$-filled copolymer of ethylene and methacrylic acid (melt index=6), the methacrylic acid representing 9.9 percent of the copolymer, is stretched onto the forming frame. The copolymer sheet is then transferred into the oven and heated to a temperature of 175° C. It is then withdrawn and placed over the frame and sucked down over the entire surface with a force of 22–25 inches of mercury. The tacky adhesive permits immediate release of the vacuum and withdrawal of the covered frame. The three sides of the frame are tightly covered with the white laminate and reflect substantially all the original detail and relief. In some locations, it is necessary to drill small holes in the frame to permit evacuation of corner pockets, etc. Excess plastic is then trimmed off after the adhesive has cured for a 24-hour period at room temperature or 8 hours at 90° F.

Similar procedures are followed to cover the opposite sides of the frame and the unglazed window sections.

For greater economy of plastic materials, individual components of the window frame can be closely packed on the vacuum-forming apparatus' platform. In this manner, many frames can be covered in knockdown form. It is then necessary to reassemble the components after the excess plastic sections have been trimmed off.

A newly formed laminate of the copolymer with polyvinyl fluoride film can be bonded directly to wood through the copolymer side prior to the curing of the bond between polyvinyl fluoride and the copolymer. Suitable results are obtained as well if the polyvinyl fluoride copolymer laminate is permitted to cure for any length of time.

Drawing tests performed in a standard "Instron" controlled environment tensile testing apparatus indicate that the laminate (1.5-mil thick polyvinyl fluoride, 25-mil thick base sheet of the filled copolymer, 1.5-mil thick adhesive) can be subjected to ultimate elongations of 100–200% (2–4 times its original size) at laminate temperatures of 150–200° C. However, best results have been obtained when maximum elongations are held between 125–180% with temperatures held at 168–180° C. Under these conditions the top sheets are elastic while sufficiently strong to retain the very soft copolymer base sheet. The base sheet alone under similar conditions would be too limp to vacuum form.

Another advantage realized with the laminate of the invention is that within the above-stated temperature ranges, one can obtain a clad structure which has sealed edges Normally with the top sheets alone, the plastic does not weld to itself on contact at the edges of the covered object. Therefore, when the edges are trimmed a break in the cover results which needs to be sealed by additional procedures. Actually, at the preferred temperatures the filled copolymers flow easily and weld to themselves at all points of self-contact leaving a completely sealed structure. The very fine line of the unwelded relatively thin top sheet poses no disadvantage.

Example 2

A 20-mil thickness of a sheet of the copolymer of ethylene and maleic anhydride, the latter representing 6% by weight of the copolymer, filled with 15% cement and 0.5% carbon black is laminated to a 3-mil thickness of polyvinyl fluoride film containing brick-red pigment. This laminate in the form of 4 ft. wide rolls, is heated to 150° C., then passed through an embossing roll which stamps the polyvinyl fluoride side with 3¾" x 7½" rectangles spaced at 5/16" apart to give the impression of laid brick tiles. The material is then bonded to plywood paneling to give the surface of the paneling the appearance of laid tiles. The adhesive used in the previous example is applied prior to bonding by painting the surface of the copolymer with thicknesses up to about 5 mils and, thereafter, permitting it to dry at room temperatures for periods of about 1 hour before contact with the paneling. The 4 ft. wide sheets are smoothed on with a 1 ft. x 2 in. diameter rubber roller using a pressure of about 75 p.s.i. to give good bonding. The finished walls have superior smoothness and peel strength after curing.

The material bonded to the plywood paneling can also be bonded to concrete block walls directly.

Example 3

Sheets of laminate measuring 1.5 ft. x 5 ft. are handmade by gluing 2-mil thick sheets of white polyvinyl fluoride film to 30-mil thick sheets of a polyethylenemethacrylic acid copolymer (9.7 weight percent methacrylic acid) filled with 46 percent white portland cement and 1 percent carbon black. Adhesives used are "Hybond 80," a neoprene base resin supplied by Pierce and Stevens Chemical Company and a polyester type adhesive manufactured by E. I. du Pont de Nemours and Company. These sheets are placed singly into a 6 ft. x 8 ft. platen size standard vacuum forming machine (manufactured by Comet Corp.) and subjected to the oven temperature of 800–900° F. for a period of 35 seconds to soften. They are then placed over a shingle mold and pulled down over the form with a pressure of 25 inches of mercury and allowed to cool prior to release.

An 8-inch by 4-foot identical impression of a row of ½ inch thick material substantially identical in appearance to a standard slate shingle having ¼ inch interspace is obtained. The unembossed flat section at the top and bottom edges may be shaped into overlaps and interlocks by bending the sheets around a heated mandrel. The top section may be bent up at an angle of 150° to the horizontal while the bottom edge may be bent down at the same angle.

Example 4

In order to demonstrate the unique thermoformability of the laminates of the invention a special mold is constructed placing four wells in a platform box. Each well is made from aluminum tubing 8.41 centimeters internal diameter and 2.5 inches deep and spaced at the corners of a 4 inch square. The depth of each well is regulated by adding circular wooden discs so that depths of 1.25, 1.5, 2.0 and 2.5 inches are obtained. The mold is placed into a vacuum former as previously described.

Several types of polyvinyl fluoride of 2-mil thickness were laminated to the copolymer base sheet (35 mils thick) described in Example 1. Both oriented and unoriented polyvinyl fluoride are used and are bonded to the base sheet employing the adhesive disclosed in Example 1.

The 18-inch square sheets of laminates are heated to temperatures of about 175° C.±2° C. and drawn down into the wells. Several draw downs indicate that laminates having a 24-hour adhesive cure could be pulled into the wells up to 2″ deep without failure in any way.

Example 5

The previous example shows the extent of drawing into a wide round opening. This example demonstrates the formability of the laminate of the invention into narrow square-edged openings without the formation of webs (excess protrusion of the laminate sheet at the square edge).

A mold is constructed by nailing square strips of wood to a baseboard. The strips vary in height and interspacing between ⅛ inch and 1 inch. Results indicate that in molding and forming square-edged profiles, one should preferably maintain the height-to-width ratio of the interspace below 0.8, particularly for heights up to ¼ inch and widths up to ⁵⁄₁₆ inch.

Example 6

A standard six over six window sash and frame are clad on both the interior and exterior sides with a laminate consisting of a white 2-mil polyvinyl fluoride film bonded to a 35-mil film of the backing substrate comprising a copolymer of ethylene and methacrylic acid filled with 35 percent portland cement and 2 percent carbon black.

This is accomplished by placing the unglazed sash on the platen of a standard 6 ft. x 8 ft. Comet Vacuform apparatus. The surfaces to be clad are brush-coated with about a 5-mil thick layer of the adhesive described in detail in Example 1 and is permitted to dry until tacky. Small 0.04″ holes are drilled through the sash in corners and locations where unavoidable air pockets might form within the partially clad structure.

Having prepared the sash as above, the sheet of laminate is exposed to temperatures of 700–800° F. for a period of 42 seconds in the oven, after which it is pulled down over the platen using a pressure of 26 inches of mercury. The vacuum is released after 3 minutes and the sash is removed. Excess laminate is trimmed from the clad surfaces leaving a tightly clad sash having exterior smoothness.

We claim:

1. A process for forming a laminate which comprises chemically activating the surface of a polyvinyl fluoride film; applying an adhesive to said activated surface and to the surface of a sheet of a copolymer of a major amount of hydrocarbon monomer having the formula R—CH=CH$_2$, R being selected from the group consisting of hydrogen and an alkyl radical having 1 to 8 carbon atoms, and a minor amount of an alpha,beta-ethylenically unsaturated carboxylic acid having 3 to 8 carbon atoms filled with 10–60 weight percent of an amphoteric oxide; bringing said surfaces into contact under pressure; and curing the adhesive.

2. A process as in claim 1 wherein said adhesive is a mixture of an amino ester-modified vinyl polymer and a compound selected from the group consisting of a polyglycidyl ether of a dihydric phenolic compound having an epoxy equivalent of 100–3000 and a vinyl-type epoxy compound having an epoxy equivalent of $7.69 \times 10^{-5}$ to $76.9 \times 10^{-4}$ mols epoxy per gram of polymer.

3. A process as in claim 1 wherein the surface of said sheet of copolymer is chemically activated.

4. A laminate comprising a top sheet of a thin polyvinyl fluoride film bonded to a relatively thick base sheet of a filled copolymer of a major amount of hydrocarbon monomer having the formula R—CH=CH$_2$, R being selected from the group consisting of hydrogen and an alkyl radical having 1 to 8 carbon atoms, and a minor amount of an alpha,beta-ethylenically unsaturated carboxylic acid having 3 to 8 carbon atoms filled with 10–60 weight percent of an amphoteric oxide.

5. A laminate as in claim 4 wherein said amphoteric oxide is portland cement.

6. A laminate as in claim 4 wherein said hydrocarbon monomer is ethylene.

7. A laminate as in claim 4 wherein said alpha,beta-ethylenically unsaturated carboxylic acid is methacrylic acid.

8. A laminate as in claim 4 wherein said filled copolymer is composed of 80–95 mol percent ethylene, and a minor amount of methacrylic acid, and filled with 25–35 weight percent of portland cement.

9. A wooden article covered with the laminate of claim 4.

10. A cementitious article covered with the laminate of claim 4.

11. A laminate as in claim 4 wherein said base sheet is from 5 mils to 250 mils thick, and said top sheet is from 0.025 to 0.5 times the thickness of the base sheet, but no greater than 10 mils.

12. A laminate as in claim 11 wherein said base sheet is from 20 mils to 30 mils thick.

13. A laminate as in claim 11 wherein said top sheet is from 0.5 mil to 5 mils thick.

14. An article of manufacture consisting essentially of a wooden surface; a layer of adhesive on said surface; a base sheet in contact with said adhesive layer, said sheet being of a filled copolymer of a major amount of hydrocarbon monomer having the formula R—CH=CH$_2$, R being selected from the group consisting of hydrogen and an alkyl radical having 1 to 8 carbon atoms, and a minor amount of an alpha,beta-ethylenically unsaturated carboxylic acid having 3 to 8 carbon atoms filled with 10–60 weight percent of an amphoteric oxide; and a polyvinyl fluoride film bonded to said base sheet, said base sheet being substantially thicker than said polyvinyl fluoride film.

15. An article of manufacture as in claim 14 wherein said adhesive is a mixture of an amino ester-modified vinyl polymer and a compound selected from the group consisting of a polyglycidyl ether of a dihydric phenolic compound having an epoxy equivalent of 100–3000 and a vinyl-type epoxy compound having an epoxy equivalent of $7.69 \times 10^{-5}$ to $76.9 \times 10^{-4}$ mols epoxy per gram of polymer.

References Cited

UNITED STATES PATENTS

| | | | |
|---|---|---|---|
| 2,781,077 | 2/1957 | Dovidio | 156—213 |
| 3,133,854 | 5/1964 | Simms | 161—189 |
| 3,153,684 | 10/1964 | Bryan et al. | 264—80 |
| 3,272,771 | 9/1966 | Busche et al. | 260—41 |
| 3,284,277 | 11/1966 | Bonacci et al. | 156—272 X |
| 3,329,545 | 7/1967 | Hamilton | 156—213 |

HAROLD ANSHER, *Primary Examiner.*